US012605721B2

(12) United States Patent
Dunbar

(10) Patent No.: US 12,605,721 B2
(45) Date of Patent: Apr. 21, 2026

(54) COATING LANCE

(71) Applicant: Honda Motor Co., Ltd., Tokyo (JP)

(72) Inventor: Andrew P Dunbar, Dayton, OH (US)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 18/348,261

(22) Filed: Jul. 6, 2023

(65) Prior Publication Data

US 2025/0010312 A1 Jan. 9, 2025

(51) Int. Cl.

*B05B 1/00* (2006.01)
*B05B 7/04* (2006.01)

(52) U.S. Cl.

CPC ............ *B05B 1/005* (2013.01); *B05B 7/0416* (2013.01)

(58) Field of Classification Search

CPC .............................. B05B 7/0416; B05B 1/005
See application file for complete search history.

(56) References Cited

U.S. PATENT DOCUMENTS

| | | | |
|---|---|---|---|
| 4,989,838 | A | 2/1991 | Kaldon et al. |
| 5,251,879 | A | 10/1993 | Floyd |
| 2014/0291902 | A1 | 10/2014 | Alves Freire et al. |

FOREIGN PATENT DOCUMENTS

| | | | |
|---|---|---|---|
| CN | 203563586 | U | 4/2014 |
| CN | 211915494 | U | 11/2020 |
| CN | 113106181 | B | 8/2022 |
| DE | 3022804 | A1 | 6/1981 |
| EP | 3315616 | B1 | 8/2020 |
| GB | 1367556 | A | 9/1974 |
| WO | 199741270 | A1 | 11/1997 |
| WO | 2018115503 | A1 | 6/2018 |

OTHER PUBLICATIONS

Machine translation of CN203563586 (Year: 2014).*

* cited by examiner

*Primary Examiner* — Vishal I Patel
(74) *Attorney, Agent, or Firm* — Gregory J Burke; American Honda Motor Co., Inc.

(57) ABSTRACT

A coating lance includes a body having first and second segments interconnected in a joint region. The first segment, which can be made from metal, includes an outer diameter reducing from a first outer diameter in a rearward portion through a transition portion to a second outer diameter in a main segment portion. The second body segment, which can be made from carbon fiber, is substantially uniform in outer diameter throughout. A coating tube extends within an interior of the body and a nozzle end part is attached to the coating tube. The lance can also include an insert received in a discharge end of the body, a discharge end clamp secured to the insert, and a charge end clamp secured to a charging end of the body. The clamps receive the coating tube and apply a clamping force to secure the coating tube in position.

19 Claims, 11 Drawing Sheets

COATING LANCE

BACKGROUND

The present disclosure relates to coating lances, which are typically used to apply coating materials in spray form onto a surface of an object, such as a manufacturing die for example. Such coating materials, which can include clay, diatomaceous earth, water and soap, are applied onto surfaces of a die to create a barrier between the die (typically made from steel) and a molten material (e.g., iron) placed within the die. A major purpose for applying such coating materials is to facilitate subsequent extraction of the formed material from the die. FIGS. 1A and 1B illustrate a prior coating lance 10. The lance includes an elongated tubular body 12 and a nozzle assembly 14, which is illustrated schematically in FIG. 1A. The lance body 12 is formed from a single, unitary, material such as carbon fiber for example. The lance body 12 has a uniform outer diameter along its entire length from a rearward (or proximal) charging end 16 to a forward (or distal) discharging end 18.

The prior coating lance includes two additional tubes 20, 22 housed within an interior 24 of the body 12 and extending along the length of the body between opposite ends 16, 18. Each of the interior tubes 20, 22 is made from a metal material such as stainless steel. The first tube 20, which is larger in diameter than the second tube 22, carries the coating material to the discharge end 18 for delivery of the coating spray via the nozzle assembly 14. The second (smaller diameter) tube 22 carries pressurized air to the discharge end. The air stream delivered from the lance via tube 22 facilitates curing of coating material applied by nozzle assembly 14. FIG. 1C illustrates a typical manufacturing die 30 having a cylindrical body 32 for which a coating lance such as lance 10 is utilized to apply a coating spray. As shown, a part of the lance 10 that includes nozzle assembly 14 and an adjacent portion of body 12 is passed through an opening 36 in an end cap 34 of the die to extend within an interior 38.

Coating lances like lance 10 are relatively long and slender, often having for example an outer diameter under 2 inches and an overall length of more than 10 feet. Configured in this manner, the lance body 12 can be subject to undesirable deflections along an unsupported length, such as a forward (distal) portion of the lance that would extend beyond a user holding the lance in a rearward part of the lance body. Such undesirable deflections in the forward unsupported portion are particularly accentuated for lances such as lance 10, which has constant outer diameter throughout the entire length of the lance body 12, including the distal unsupported portion. In addition, the uniform outer diameter of the lance body 12 can also create close-clearance concerns for the lance in certain applications. See in FIG. 1C, for example, the limited clearance 40 remaining available around the distal end portions of lance 10 as it passes through the opening 36 in end cap 34 of die 30.

What is needed is a coating lance having reduced susceptibility to deflection in unsupported forward (discharging) portions of the lance during use, as well as a lance providing increased clearance around the distal discharging portions to facilitate operation of the lance in a wider range of applications.

BRIEF DESCRIPTION

According to one aspect, a coating lance for applying a coating material in spray form includes first and second elongated body segments interconnected at a joint region and made from dissimilar materials.

According to one embodiment, the body segments are respectively made from stainless steel and carbon fiber. The stainless body segment can include an outer diameter that is variable along its length including a first portion having a first outer diameter, a second portion having an outer diameter reducing from the first outer diameter to a second outer diameter, and a third portion having the reduced second outer diameter. The carbon fiber body segment can have a diameter that is substantially constant throughout the segment, a diameter that could be less that the second outer diameter of the first segment. The lance can include a coating tube extending within an interior of the lance body and a nozzle end part attached to an end of the coating tube. The nozzle end part can include bends defining segments arranged such two of the segments are substantially parallel and offset.

According to one embodiment, the lance can include an air passage defined within the interior to convey a pressurized air stream for curing the coating material. The lance can also include an insert received in a discharge end of the lance body, a discharge end clamp secured to the insert, and a charge end clamp secured to a charging end of the lance body, the clamps receiving the coating tube and applying a clamping force to secure the coating tube in position.

According to another aspect, a coating lance for applying a coating spray includes a tubular lance body defining an interior space and having opposite charging and discharging ends. The body has first and second segments interconnected in an intermediate joint region and made from dissimilar materials. The lance includes a coating tube extending within the interior space, and a tubular nozzle end part attached to the coating tube. The nozzle end part has inner and outer dimensions substantially matching the inner and outer dimensions of the coating tube, and the nozzle end part is attached by welding.

According to one embodiment, the nozzle end part includes first, second and third bends defining first, second, third and fourth segments and two of the segments are substantially parallel to each other and offset from one another.

According to another aspect, a hybrid coating lance includes an elongated tubular lance body having a first metal segment and a second carbon fiber segment interconnected in a joint region. The metal segment includes an outer diameter that is reduced in a transition from a first outer diameter to a second outer diameter. The carbon fiber segment includes an outer diameter that is substantially constant throughout the segment. The hybrid coating lance includes a coating tube and a tubular nozzle end part welded to the coating tube.

According to one embodiment, the hybrid coating lance includes a discharge end insert received in a discharging end of the lance body, a discharge end clamp secured to the insert, and a charge end clamp secured to a charging end of the lance body. The clamps receive the coating tube and apply a clamping force to the coating tube to secure the coating tube in position.

DETAILED DESCRIPTION

Figure 1A:
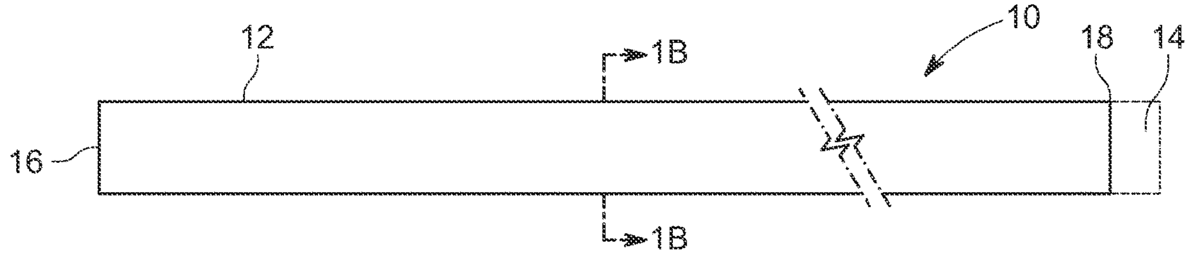
FIG. 1A (PRIOR ART)
FIG. 1A is a side view of a prior art coating lance.
Figure 1B:
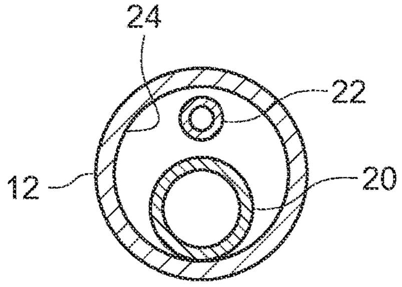
FIG. 1B (PRIOR ART)
FIG. 1B is a sectional view taken along the lines 1B-1B of FIG. 1A.

It should be understood that the description and drawings herein are merely illustrative and that various modifications and changes can be made without departing from the present disclosure. Referring now to the drawings, wherein like numerals refer to like parts throughout the several views, FIGS. 2A-2D show a coating lance 100 according to one embodiment. The coating lance 100 is of a hybrid construction having a tubular body 102 including first and second tubular segments 104, 106 that are made from different materials. The first tubular segment 104 is located rearwardly of the second tubular segment on the coating lance 100 to define a rearward (or proximal) charging end 108 of body 102. The second tubular segment 106 is located forwardly of the first segment 104 to define a forward (or distal) discharging end 110 of body 102 opposite the charging end 108. The lance 100 also includes a nozzle end part 112 located forwardly of the discharging end 110 of lance body 102 on the lance.

The hybrid coating lance 100 is configured to receive a coating material from a supply source (see source 111 illustrated schematically in FIG. 2A) adjacent the rearward charging end 108 of body 102 and to direct the coating material to the forward discharging end 110. The lance 100 is also configured to receive air from a source of pressurized air (see source 113 illustrated schematically in FIG. 2A) adjacent the charging end 108 and to deliver the air to the discharging end 110. The lance 100 includes a nozzle end part 112 located forwardly of the discharging end 110 of lance body 102 and configured to eject the coating material in the form of a spray. As will be discussed further, the coating lance 100 is also configured to eject a stream of the pressurized air adjacent to the nozzle end part 112 to facilitate curing of the coating material being sprayed from nozzle end part 112. The first and second body segments 104, 106 are interconnected at a joint region 114, for example through a sliding (or telescoping) type of connection. According to one embodiment, the first and second body segments 104, 106 could be made from stainless steel and carbon fiber, respectively. The invention is not so limited, however, and other materials for the body segments could be selected.

Figure 2A:
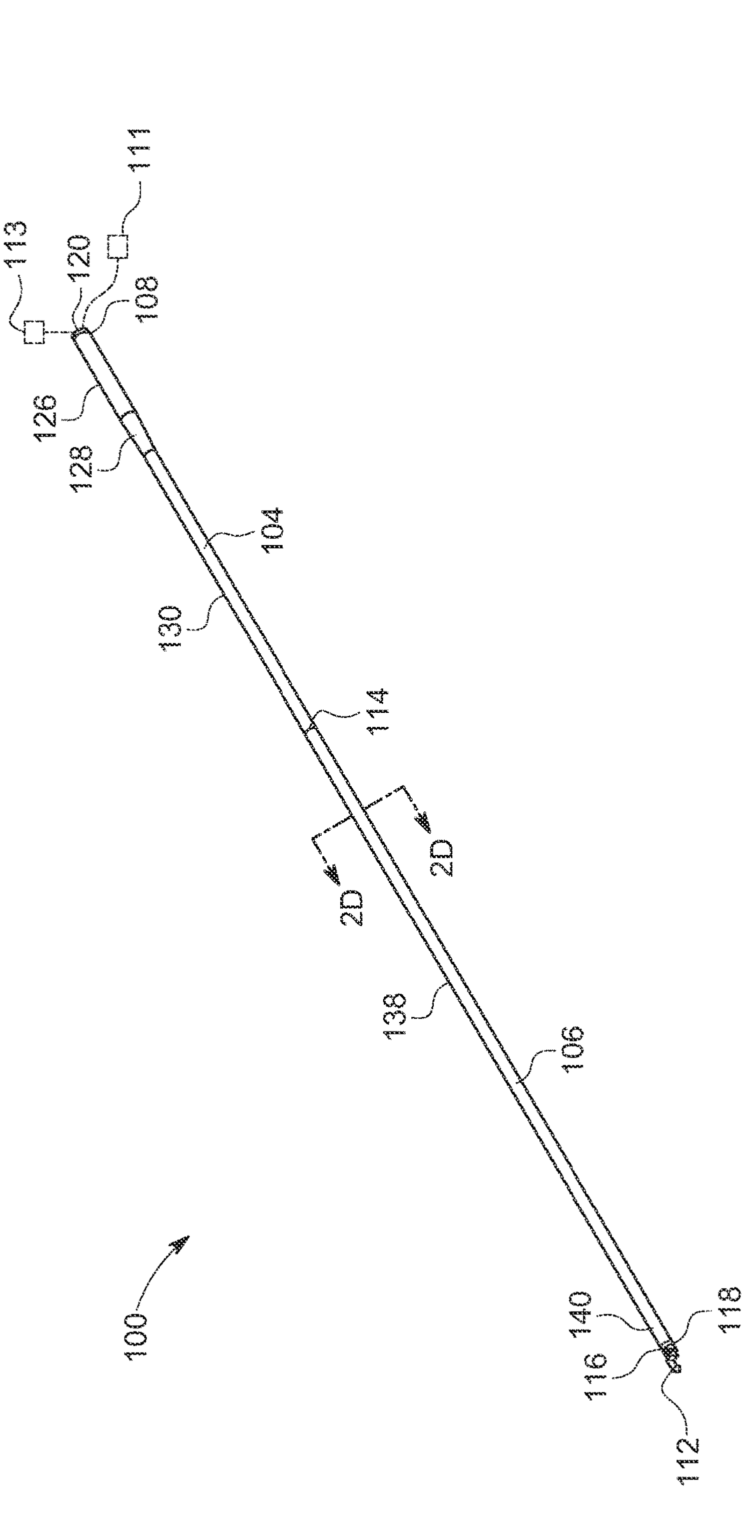
FIGS. 2A, 2B and 2C are perspective, side and end views, respectively, of a coating lance according to one embodiment.

As illustrated in FIG. 2A, the general configuration for body 102 of lance 100 is relatively long and slender. In one embodiment, the aspect ratio (length/diameter) for the lance could be between 50:1 to 100:1 and, more particularly, between 75:1 to 100:1. In one embodiment, the diameter could be in the range of 1.0 to 2.0 inches and, more particularly, between 1.5 to 2.0 inches, and the length could exceed 10 feet. As should be readily understood, such a long and slender configuration tends to increase the likelihood of deflection along an unsupported length of the body. For example, an unsupported length of lance body 102 extending forwardly from a rearward region of the lance held by a user to a more distal portion of the lance including the discharge end 110 and nozzle end part 112. This potential deflection concern is particularly accentuated for lances, such as prior lance 10, having a body made from one material and being uniform in diameter throughout its entirety including the unsupported length from the user to the distal nozzle end. As will be described in more detail, the hybrid construction of lance 100 serves to limit deflections along such unsupported lengths.

Figure 2B:
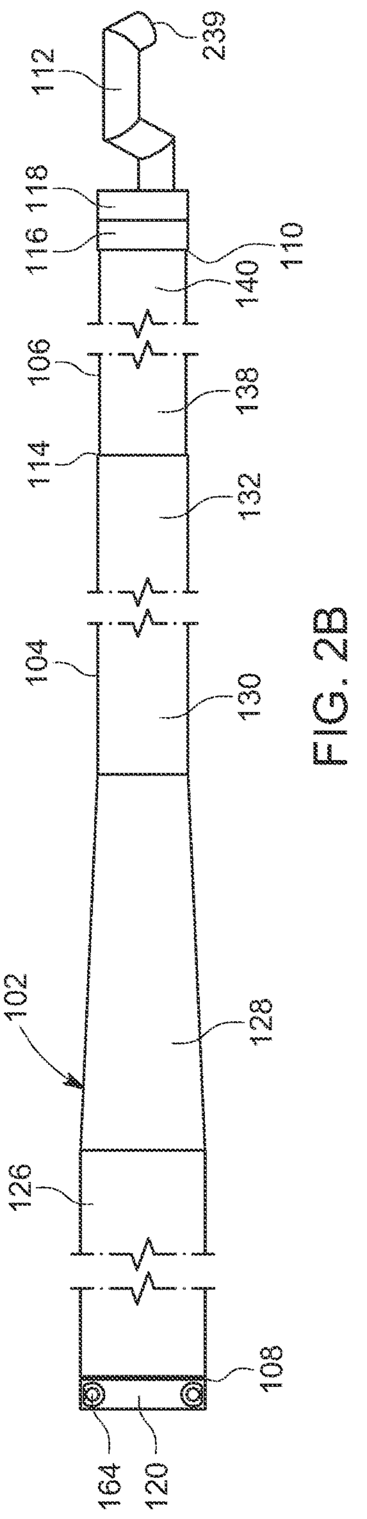
Figure 2C:
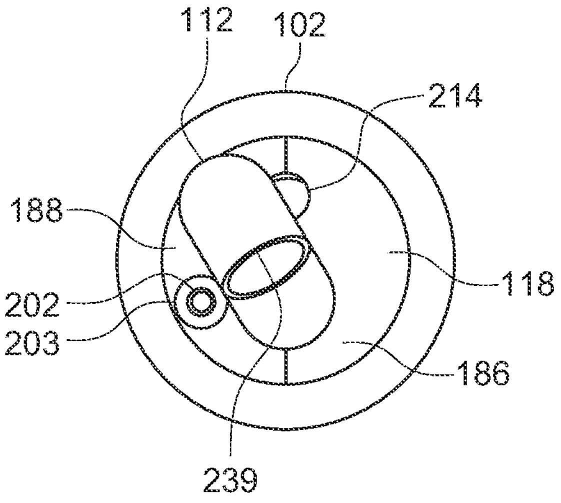

Referring to FIGS. 2B and 2C, the coating lance 100 includes a discharge end insert 116, a discharge end clamp 118, and an aft end clamp 120. The insert 116 is received at the discharge end 110 of body 102 and the discharge end clamp 118 is secured to the insert 116. The aft end clamp 120 is located rearwardly on the lance 100 and is secured to the charging end 108 of lance body 102. The discharge end clamp 118 is constructed and configured to apply a clamping force onto the coating tube 122 (or possibly onto the nozzle end 112 part attached to tube 122) to position and secure the tube 122 with respect to body 102 of lance 100.

Figure 2D:
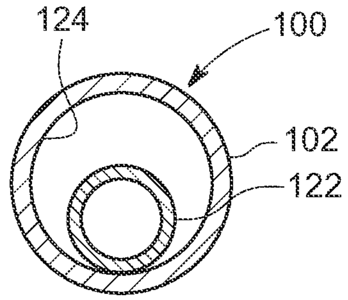
FIG. 2D is a sectional view taken along the lines 2D-2D of FIG. 2A.

Referring to the sectional view of FIG. 2D, the depicted coating tube 122 is cylindrical and is disposed within an interior space 124 defined by body 102. The coating tube 122 extends along the length of body 102 within the interior 124 to convey a coating material from the rearward charging end 108 to the forward discharging end 110 for delivery of the coating material in spray form via nozzle end part 112. According to one embodiment, the coating tube 122 could be made from stainless steel. Unlike the prior coating lance 10, the coating lance 100 does not include a separate interior air tube for conveying a curing air within the lance body. Instead, the body 102 itself is configured such that the interior space 124 defines an air passageway capable of being pressurized that extends along the length of the body. The passageway of interior space 124 receives pressurized air (e.g., from source 113) at the rearward charging end 108 for delivery of a stream of curing air via the distal discharging end 110 of body 102 and adjacent the nozzle end part 112. This construction, therefore, eliminates the need for a separate air tube extending along the interior of body 102 with coating tube 122.

Figure 3A:
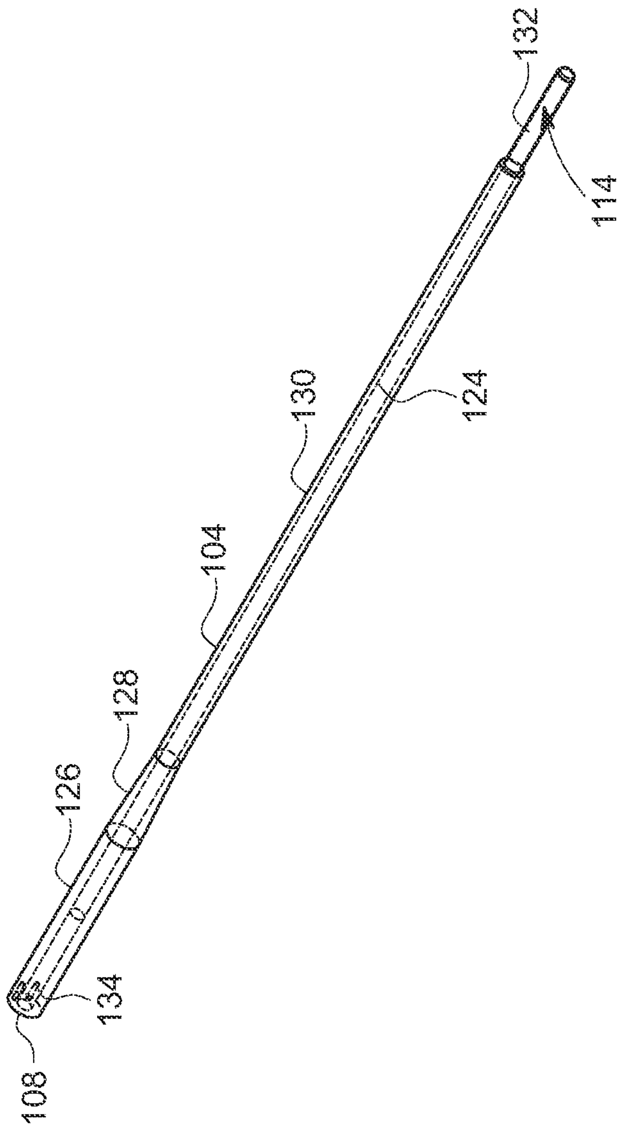
FIGS. 3A and 3B are perspective and side views, respectively of a first tubular segment of the coating lance of FIGS. 2A-2D.
Figure 3B:
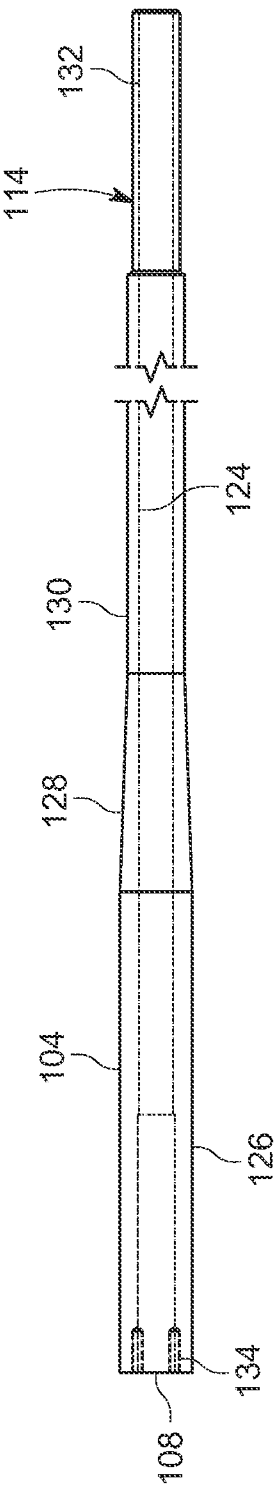

Referring to FIGS. 3A and 3B, the first body segment 104, which defines the rearward part of body 102, is shown separately. The first body segment 104 includes an interior space (or cavity) defining a portion of the body interior 124. As shown, the interior space can be substantially uniform in diameter throughout the length of the body segment 104. The outer diameter of the depicted body segment 104, however, is variable particularly adjacent the rearward end of the body segment. As shown, the first body segment 104 includes a rearward end (first) portion 126 having a first outer diameter that is relatively large compared to other portions of the lance body and a transition (second) portion 128 adjacent and forward of the rearward end portion 126. The transition portion 128 includes a tapering outer diameter that reduces the diameter from the first outer diameter to a smaller second outer diameter within the length of the transition portion 128. According to one embodiment, the second outer diameter is approximately 70 to 75% of the first outer diameter.

The first body segment 104 includes a main (third) portion 130 adjacent and forward of the transition portion 128. Part of the main portion 130 has been removed from the view of FIG. 3B to facilitate the view. As can be seen in FIG. 3A, however, the main portion 130 extends over a majority of the length of the first body segment 104. As illustrated, the outer diameter for the main portion 130 is maintained in substantially uniform manner at the second outer diameter throughout. Adjacent and forward of the main portion 130, the first body segment 104 includes a forward end (fourth) portion 132 having an outer diameter that is further reduced from the second outer diameter to a smaller third outer diameter. As will be discussed in more detail, the forward end portion 132 extends at the reduced third outer diameter throughout the joint region 114 of lance body 102 to provide for a sliding-type connection between the first and second body segments 104, 106.

Configured in this manner, the relatively large outer diameter (and associated thicker wall) for the first portion 126 of body segment 104 is desirably positioned in the rearward (proximal) end part of lance body 102. Such positioning facilitates handling of the lance body 102 by a user (e.g., increased diameter facilitates grasping) and also provides extra strength and rigidity in the charging end region of the lance body 102. The added strength and rigidity is desirable because the rearward charging end 108 of lance body 102 is the location at which connections for both coating and air supplies (e.g., from sources 111 and 113) are made. The extra wall thickness also provides for the inclusion of holes 134 extending longitudinally into the wall of body segment 104 from the rearward end 108 for receipt of fasteners (not shown) for securing the aft end clamp 120 to the first body segment 104 in well-known manner. According to one embodiment, the first body segment 104 is made from stainless steel. Such a material desirably combines the attributes of strength and durability with a high level of machinability (i.e., to facilitate the above-described variations in outer diameter).

Figure 4:
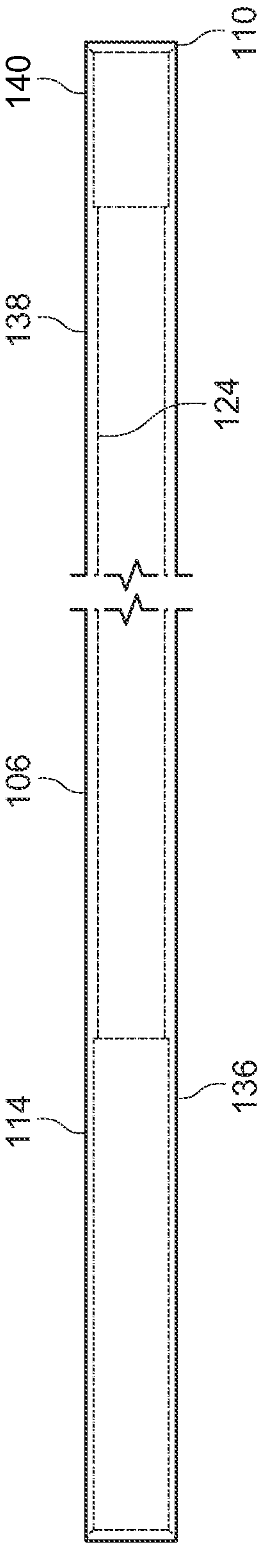
FIG. 4 is a side view of a second tubular segment of the lance of FIGS. 2A-2D.

Referring to FIG. 4, the second body segment 106, which defines the forward (distal) part of lance body 102 and the associated forward portion of the interior body cavity 124, is shown separately. Unlike the first body segment 104, the outer diameter of the second body segment 106 is maintained substantially uniform at a fourth outer diameter throughout. As can be seen in FIG. 2B, the fourth outer diameter of the second body segment 106 can be slightly smaller than the second outer diameter of the first body segment 104. According to one embodiment, the fourth outer diameter can be approximately 95% of the second outer diameter (or, as should be understood, less than approximately 70% of the first outer diameter). The second body segment 106 includes a first (rearward end) portion 136. The rearward end portion 136 of the second body segment 106 extends for a length defining the joint region 114 (together with the forward end portion 132 of first body portion 104). As should be understood, the inner diameter within the rearward end portion 136 of second body segment 106 can be cooperatively dimensioned with respect to the outer dimensions (third outer diameter) of forward end portion 132 of first body segment 104 so as to provide a sliding (or press fit) type connection between the body segments 104, 106.

The second body segment 106 includes a second (main) portion 138 adjacent to and forward of the rearward end portion 136. Some of the main portion 138 has been removed from the view of FIG. 4 for clarity. As should be understood, however, the main portion 138 for the depicted embodiment extends over a majority of the length of second body segment 106. The second body segment 106 includes a third (forward end) portion 140 adjacent to and forward of the main portion 138. As will be discussed below, an inner diameter of forward end portion 140 can be cooperatively dimensioned with respect to the discharge end insert 116 to provide for a sliding-type interconnection between the insert 116 and the forward end portion 140 of lance body segment 106.

According to one embodiment, the second body segment 106 can be made from a carbon fiber material. Carbon fiber materials have high strength properties (i.e., the strength for carbon fiber can be roughly comparable to many steels) while being relatively light in weight (i.e., roughly comparable to the weight of plastics). Carbon fiber material, however, is generally more expensive than steels including stainless steel. Also machining of carbon fiber material can be much more difficult than for steels. For example, carbon fiber tubes can be cut to length. And the inner diameter can be varied to a limited extent (e.g., inner diameter can be increased in end portions of a tube, such as for the rearward and forward end portions 136, 140 of second body segment 106 as illustrated in FIG. 4, which could be accomplished by boring in from the ends, for example). However, additional machining for carbon fiber material is limited.

The hybrid nature of the tubular lance body 102 in which a first stainless steel segment 104 is combined with a second carbon fiber segment 106 optimally balances strength, cost and machinability factors (for the first segment) with weight-down benefits without appreciable loss of strength (for the second segment). This optimized hybrid construction allowed for large reductions in the dimensions of lance body 102 over much of its length compared to the prior lance body, which had a uniform outer diameter over the entirety of the lance body. For example, according to one embodiment the outer diameter in the rearward end portion 126 of first body segment 104 of hybrid lance 100 (i.e., the first outer diameter) is approximately equal to the outer diameter of the prior carbon fiber-only lance (which is uniform in outer diameter throughout the entire lance body). As described above, the outer diameter for the hybrid lance body located forwardly of the first body segment portions 126, 128 is significantly reduced (i.e., down to 70-75 percent). As can be appreciated by referring to the view shown in FIG. 2A, the portion of the hybrid lance body that is forward of first segment portions 126, 128 represents a vast majority of the hybrid lance body 102 (e.g., 85 to 90% of the lance body length according to one embodiment).

When a lance such as coating lance 100 is supported for use (i.e., held by an operator to apply coating), a substantial part of the lance can remain unsupported. For example, the lance 100 could be configured such that a typical user would support the lance body 102 by applying a split-hand support (i.e., hands at two spaced-apart locations) spanning much or all of the first (proximal) body segment 104. As a result, most or all of the second (distal) body segment 106 would be left unsupported (i.e., extending in cantilever-manner beyond a forward hand of the user that is supporting the lance). As should be understood, the distal parts of both the prior lance and the hybrid lance are formed from carbon fiber and, therefore, the reduction in size and weight for the distal portions of the hybrid lance 100 would render the hybrid lance 100 easier to maneuver (i.e., for insertion into the interior of cylindrical die 30) and should also serve to limit deflections of this portion of the hybrid lance 100.

Figure 5A:
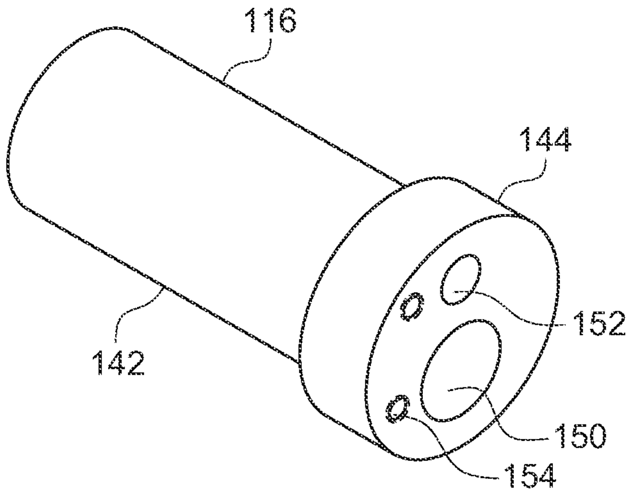
FIGS. 5A, 5B and 5C are perspective, side and end views, respectively, of a discharge end insert of the coating lance of FIGS. 2A-2D.
Figure 5B:
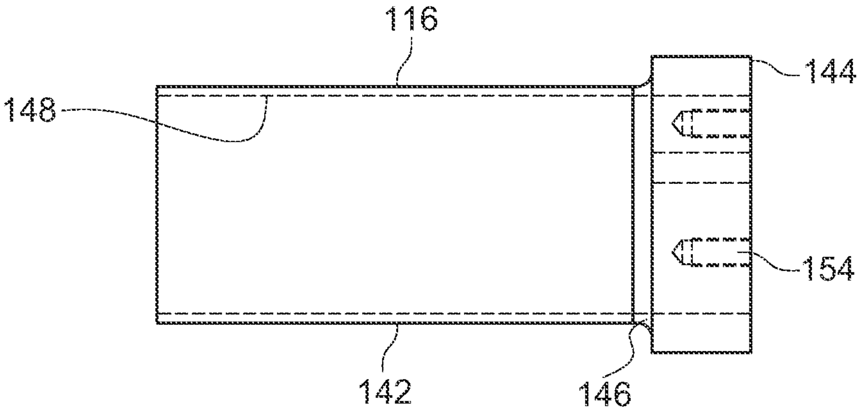
Figure 5C:
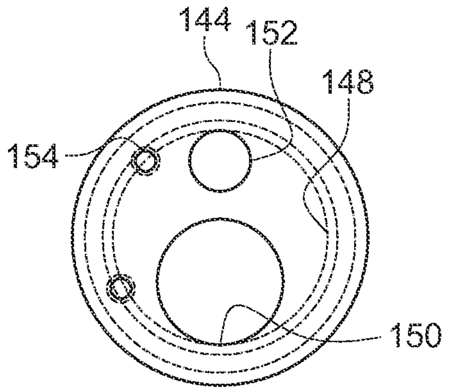

Referring to FIGS. 5A to 5C, the discharge end insert 116 is shown separately from the coating lance 100 of FIGS. 2A to 2D. The insert 116 functions to close off the interior space 124 of lance body 102 at the discharge end 110 and to provide support for the discharge end clamp 118, which is secured to the insert 116 (as well as coating tube 122 and nozzle end part 112 engaged by clamp 118). The discharge end insert 116 includes an elongated cylindrical body 142 and a disc-shaped head portion 144 connected to the body 142. As shown in FIG. 5B, the insert head portion 144 is dimensioned to extend radially outwardly beyond an outer diameter of the insert body 142 to define an annular shoulder 146. The insert body 142 is configured for sliding receipt within the interior cavity 124 of second body segment 106 until the insert shoulder 146 abuts against the distal discharging end 110 of body 102 as illustrated in FIG. 2B. The insert body 142 includes a cylindrical interior cavity 148. As should be understood, the interior cavity 148 of insert body 142 communicates with the interior space 124 defined by second body segment 106 when the discharge end insert 116 is received within the end of body segment 106.

The insert head portion 144 defines first and second through-holes 150, 152 extending axially (longitudinally) through the head portion 144 to communicate with the body interior cavity 148 (see FIG. 5C). The first (larger) through-hole 150 can have a diameter substantially equal to (or slightly larger than) the outer diameter of the coating tube 122 (see FIG. 2B) to facilitate receipt of the coating tube 122 through the insert head portion 144. The second (smaller) through-hole 152 is arranged to receive a stream of curing air from the insert interior cavity 148 via the interior space 124 of body 102, which as discussed above can be pressurized by charge air introduced into the body 102 via the proximal charging end 108. The discharge end insert 116 also includes a pair of openings 154 (which could be internally threaded) for receiving fasteners to secure the discharge end clamp 118 to the insert 116.

Figure 6A:
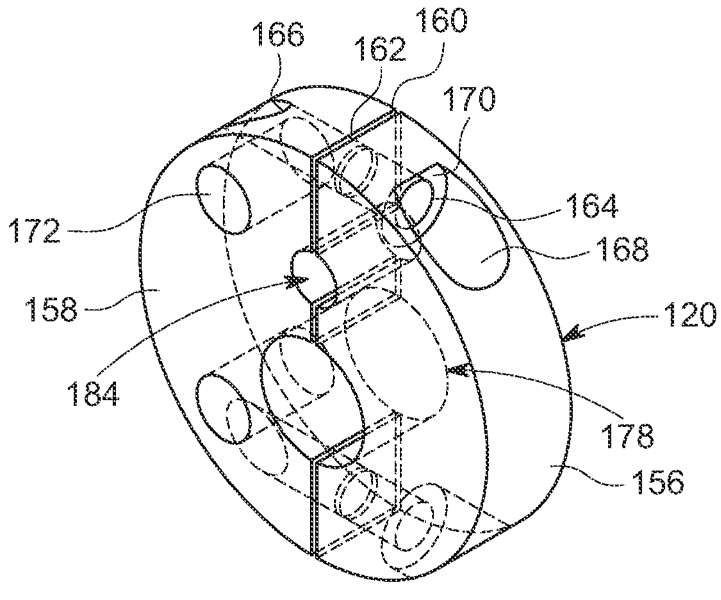
FIGS. 6A, 6B and 6C are perspective, end and side views, respectively, of an aft end clamp of the coating lance of FIGS. 2A-2D.
Figure 6B:
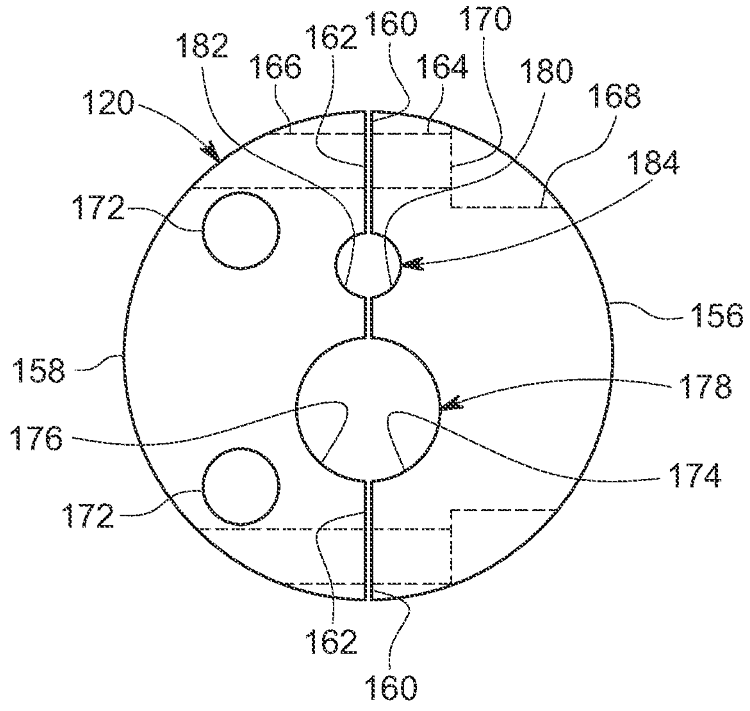
Figure 6C:
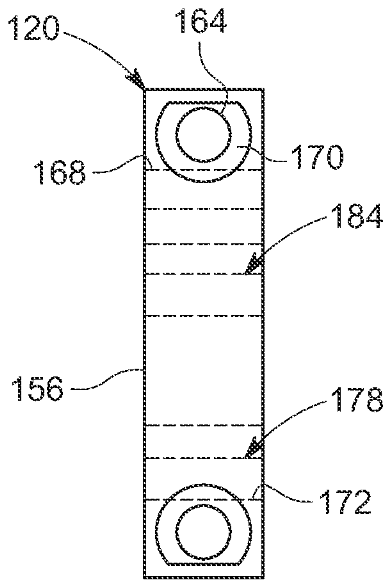

Referring to FIGS. 6A to 6C, the aft end clamp 120 is shown separately from the coating lance 100 of FIGS. 2A to 2D. The functions of aft end clamp 120 include: closing off the open end of the body interior space 124; supporting and positioning the coating tube 122 within the cavity 124; and providing access for the delivery of coating material and curing air into the lance body 102 from sources 111, 113 via the charging end 108. The aft end clamp 120 is generally disc-shaped in overall configuration and includes separate first and second clamp parts 156, 158. In the depicted embodiment, each of the clamp parts 156, 158 constitutes substantially half of the overall clamp 120. The aft clamp parts 156, 158 respectively include contact surfaces 160, 162 configured for abutting contact relation with each other as shown when the clamp parts are secured together. The first clamp part 156 includes a pair of holes (upper and lower) 164 extending laterally through the part and communicating with the contact surfaces 160. Similarly, second clamp part 158 includes a pair of laterally-extending holes 166 communicating with contact surface 162. As illustrated, the holes 164, 166 in the aft clamp parts 156, 158 align with each when the contact surfaces 160, 162 are brought together for receipt of fasteners (not shown) to secure the clamp parts 156, 158 to each other. In the depicted embodiment, the first clamp part 156 also includes recesses 168 configured to define annular bearing surfaces 170 around holes 164.

As should be understood, the bearing surface 170 is configured to establish contact with the head of a fastener for developing compression forces when a fastener engages hole 164 to secure the parts 156, 158 together in the well-known manner. The second clamp part 158 defines a pair of through-holes 172 extending axially (longitudinally) through the part 158. These holes 172 are alignable with the holes 134 formed in the end of first body segment 104 to receive shafts of fasteners (not shown) passing through part 158 and threadedly engaging holes 134 for securing the aft end clamp 120 to the first body segment 104. The aft clamp parts 156, 158 respectively define semi-cylindrical channels 174, 176 formed into the contact surfaces 160, 162 to cooperatively form a first cylindrical opening 178 extending axially through the aft end clamp 120 when the clamp parts 156, 158 are secured together. The first opening 178 is dimensioned and arranged to receive the coating tube 122 to help position the tube at a desired location within the interior space 124 of the lance body 102. The first opening 178 also provides for engagement by a coating supply (e.g., for coating supply 111) for introducing a coating into the coating tube 122 at the charging end 108 of the lance body 102. The aft clamp parts 156, 158 also respectively include another pair of semi-cylindrical channels 180, 182 extending into the contact surfaces 160, 162 and collectively forming a second cylindrical opening 184 extending axially through the aft end clamp 120. The second opening 184 provides access for engagement by a charge air supply (e.g., for source 113) for introducing a pressurized curing air into the interior space 124 of lance body 102.

Figure 7A:
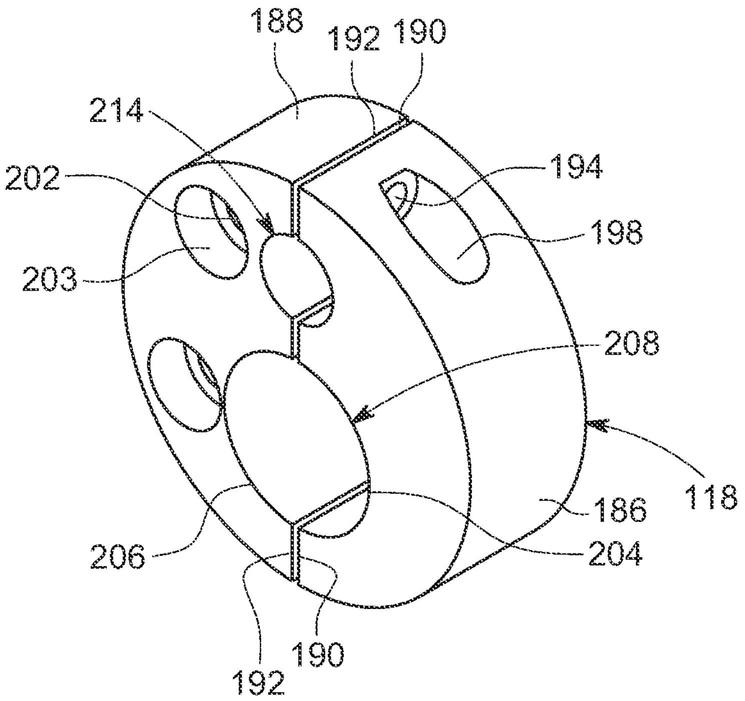
FIGS. 7A, 7B and 7C are perspective, end and side views, respectively, of a discharge end clamp of the coating lance of FIGS. 2A-2D.
Figure 7B:
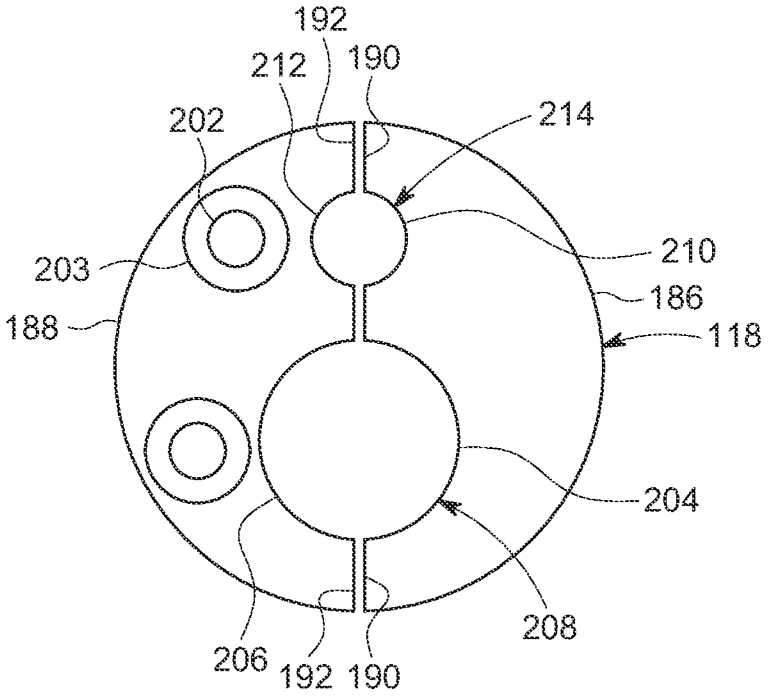
Figure 7C:
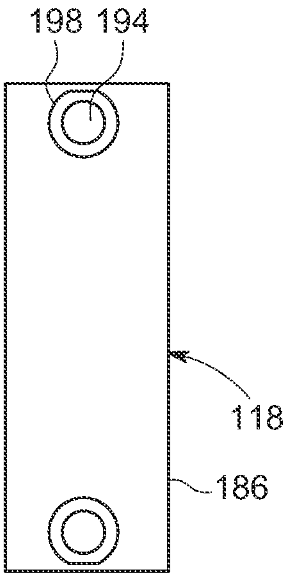

Referring to FIGS. 7A to 7C, the discharge end clamp 118 is shown separately from the coating lance 100 of FIGS. 2A to 2D. In a similar manner to aft end clamp 120, discharge end clamp 118 is generally disc-shaped in overall configuration and includes separate first and second clamp parts 186, 188 respectively including contact surfaces 190, 192 configured for abutting relation when the parts are brought together and secured to each other. Also in similar manner, the nozzle end clamp parts 186, 188 respectively include laterally-extending holes for securing the clamp parts to each other. In the views of FIGS. 7A to 7C, only the laterally-extending holes 194 in the first clamp part 186 are visible. However, as should be understood based on the above-described construction for aft clamp 120, the laterally-extending holes in the second clamp part 188 are alignable with holes 194 for receiving threaded fasteners in well-known manner for securing the clamp parts 186, 188 to each other. As shown, the holes 194 in the first clamp part 186 have recesses 198 defining bearing surfaces 200 for engagement by the head of a fastener. The second part 188 of discharge end clamp 118 also includes axially-extending through holes 202 for receipt of fasteners to secure clamp 118 to the discharge end insert 116.

As shown in the depicted embodiment, the holes 202 in second clamp part 188 can be counterbored (see 203) to provide for engagement with a fastener such that the head of the fastener is recessed below the adjacent surface of part 188. In similar manner as the aft end clamp, the clamp parts 186, 188 of discharge end clamp 118 include a first set of semi-circular channels 204, 206 collectively defining a first cylindrical opening 208 in clamp 118 and a second set of semi-circular channels 210, 212 defining a second cylindrical opening 214. The first opening 208 is configured to receive and engage the coating tube 122 to support the tube 122 and the nozzle end part 112, which is described in further detail below. The second opening 214 is configured for alignment with the opening 152 in the discharge end insert 116. Arranged in this manner, the aligned openings 152, 214 can convey a stream of curing air from the interior space 124 of lance body 102 via the interior cavity 148 of insert 116 to discharge an air stream adjacent the nozzle end part 112 to promote more efficient curing of an applied coating spray.

Figure 8A:
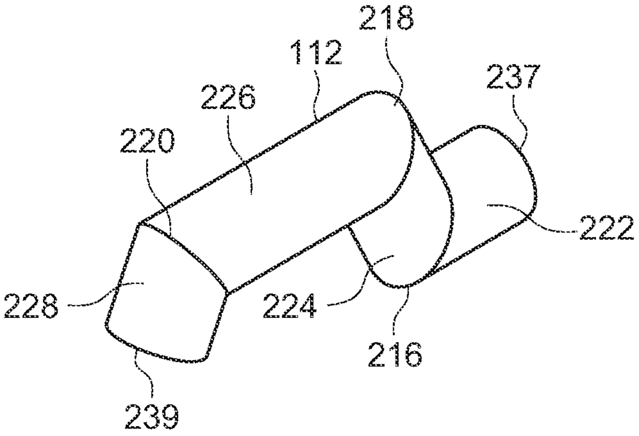
FIGS. 8A, 8B and 8C are perspective, side and end views, respectively, of a nozzle end part of the lance of FIGS. 2A-2D.
Figure 8B:
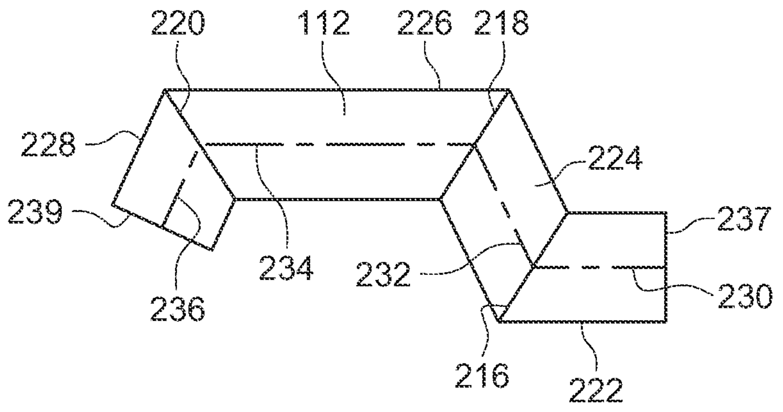
Figure 8C:
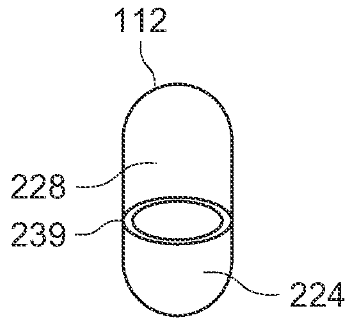

Referring to FIGS. 8A to 8C, the nozzle end part 112 is shown separately from the coating tube 122 and lance 100 of FIGS. 2A to 2D. As shown in FIG. 8C, the nozzle end part 112 is tubular. According to one embodiment, the nozzle end part 112 is dimensioned to have substantially similar inner and outer diameters as coating tube 122 and is formed from a similar material (e.g., stainless steel) to promote attachment between the coating tube 122 and the nozzle end part 112 (e.g., using a welding process). The nozzle end part 112 includes three transitions or bends 216, 218, 220, which could be created by bending a tubular length of material according to one embodiment. The three transitions 216, 218, 220 respectively form a series of four segments 222, 224, 226, 228 in the nozzle end part respectively defining four central axes 230, 232, 234, 236. As shown, the bends serve to reorient the segments such that the axis of a given segment is non-linear with respect to that of either a segment that precedes the given segment in the series or a segment that follows the given segment. The bends can also be configured as shown such that two of the segments are substantially parallel to each other with their central axes offset with respect to each other. In the depicted embodiment, the first and third segments 222, 226 are substantially parallel to each other and offset. The invention is not so limited, however, and the nozzle end part could be configured alternatively such that the second and fourth segments 224, 228 are substantially parallel and offset. As should be understood, such a configuration in which segments are offset in parallel fashion can desirably serve to function as a built-in trap within the nozzle end part 112. The nozzle end part 112 includes a first (proximal) end 237 defined by the first segment 222. The nozzle end part 112 includes an opposite second (distal) end 239, from which the coating spray is discharged, defined by fourth segment 228.

The inclusion in coating lance 100 of the nozzle end part 112, which is attached directly to the end of coating tube 122 and arranged to include the built-in trap configuration, eliminated the need for a separate nozzle assembly. This allowed for further weight down efficiencies at the distal end of the coating lance compared to the prior lance 10 in addition to the above-discussed weight down efficiencies associated with the reductions in lance body size. As should be understood, the weight down provided by the nozzle end part design is particularly desirable for limiting deflection in lance 100 given that the location of the nozzle is at the extreme distal end of the lance 100.

Figure 1C:
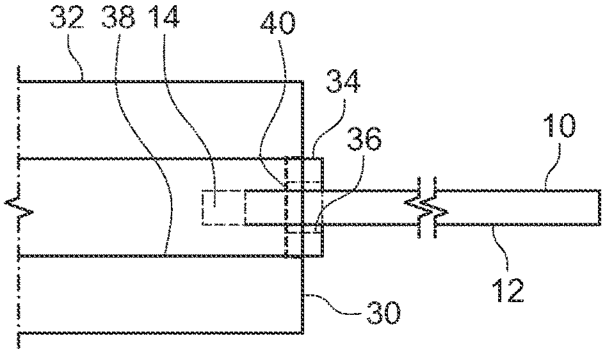
FIG. 1C (PRIOR ART)
FIG. 1C is a side view illustrating the lance of FIG. 1A inserted through an end cap opening for a cylindrical die to coat the inner surface of the die.
Figure 9:
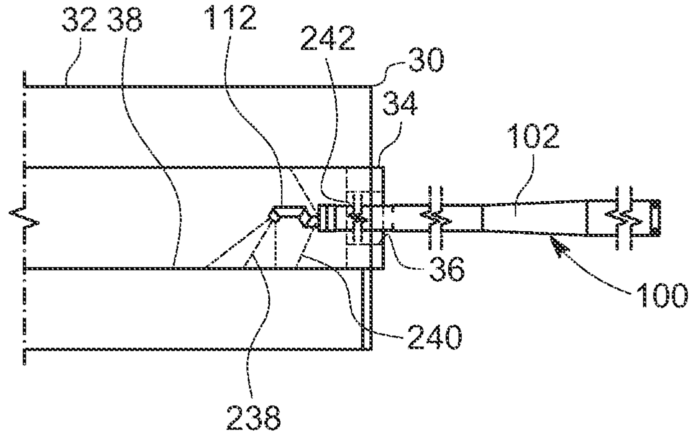
FIG. 9 is a side view illustrating the lance of FIGS. 2A-2D inserted through an opening in the end cap for the cylindrical die that was shown in FIG. 1C.

Referring to FIG. 9, the coating lance 100 is shown in use with the same manufacturing die 30 from FIG. 1C to illustrate the contrasting size in the distal end parts of coating lances 10 and 100 as well as the available clearance around the lances during their usage. The die 30 includes cylindrical body 32, and end cap 34 with opening 36, which provides access to the die interior for a coating lance such as lance 100. In FIG. 9, a distal part of the lance 100 that includes the nozzle end part 112, discharge end clamp 118, discharge end insert 116 and a portion of the second segment 106 of lance body 102 has been passed through end cap opening 36 to deliver coating material 238 and curing air 240 within the interior 38 of die 30. The clearance provided between the end cap 34 and the body 102 of lance 100 can be seen at 242. As can be seen by comparing FIG. 1C and FIG. 9, the increase in clearance 242 for lance 100 compared to the clearance 40 for prior lance is dramatically increased (e.g., approximately 1.6 times the clearance). As should be understood, such increased clearance would greatly facilitate the use of the lance by an operator in many applications such as the use in FIG. 9 to coat die 30. As should also be understood, the above-discussed removal of weight in the distal end parts also serves to facilitate maneuverability and handling ease during the use of the lance 100 by an operator and could also serve to limit deflection in the distal end part of the lance.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A coating lance for applying a coating material in spray form, the coating lance comprising:
- a first elongated tubular body segment; and
- a second elongated tubular body segment, the first and second body segments interconnected at a joint region to form a lance body, the first and second body segments made from dissimilar materials,
- wherein the material for the first body segment of the lance body is stainless steel and the material for the second body segment is carbon fiber.

2. The coating lance of claim 1, wherein the first body segment defines a rearward charging end of the lance body and the second body segment defines a forward discharging end of the lance body.

3. The coating lance of claim 2, wherein the first and second body segments interconnect with each other in the joint region through a sliding connection.

4. The coating lance of claim 2, wherein the stainless steel body segment includes first, second and third portions, the first portion defining the rearward charging end of the lance body and having a first outer body diameter, the second portion located forwardly of the first portion and having an outer diameter that transitions from the first outer body diameter to a second outer body diameter that is less than the first outer body diameter, the third portion located forwardly of the second portion and having an outer diameter that is substantially equal to the second outer body diameter.

5. The coating lance of claim 4, wherein the carbon fiber body segment has an outer diameter that is less than or equal to the second outer body diameter.

6. The coating tube of claim 5, wherein the outer diameter of the carbon fiber body segment is less than the second outer body diameter.

7. The coating lance of claim 2 further comprising a coating tube disposed within an interior of the lance body, the coating tube operably connected to a supply of coating material and extending along the lance body to convey the coating material from the charging end of the lance body to the discharging end of the lance body.

8. The coating lance of claim 7, wherein the interior of lance body defines an air passageway operably connected to a supply of pressurized air and extending along the lance body to convey the air from the charging end of the lance body to the discharging end of the lance body.

9. The coating lance of claim 8 further comprising a nozzle end part attached to an end of the coating tube for discharge of the coating material from the coating lance via the nozzle end part.

10. The coating lance of claim 9, wherein the nozzle end part is tubular having inner and outer dimensions that are substantially equal to inner and outer dimensions at the end of the coating tube, and wherein the nozzle end part is attached to the coating tube by welding.

11. The coating lance of claim 9, wherein the nozzle end part includes first, second and third bends defining first, second, third and fourth segments, the first bend located between the first and second segments, the second bend located between the second and third segments, and the third bend located between the third and fourth segments.

12. The coating lance of claim 11, wherein each of the nozzle end part segments has a central axis, and wherein the bends of the nozzle end part are configured such that the axes of two of the segments are substantially parallel to each other and offset from one another.

13. The coating lance of claim 7 further comprising a discharge end insert, a discharge end clamp, and an aft end clamp, the discharge end insert including an elongated tubular body and a head portion, the tubular insert body defining an outer diameter and the insert head portion extending radially outward beyond the insert body outer diameter to define an annular shoulder, the insert body slidably received by the lance body at the discharging end such that the shoulder abuts against the lance body end, the insert head portion defining a first opening receiving the coating tube to position and support the coating tube adjacent the lance body discharging end, the discharge end clamp secured to the insert head portion, the aft end clamp secured to the charging end of the lance body.

14. The coating lance of claim 13, wherein each of the aft end clamp and the discharge end clamp includes first and second half segments defining contact surfaces that are brought into abutting contact relation to apply a clamping force when the half segments are secured to each, and wherein the half segments for each of the aft end clamp and the discharge end clamp include a first pair of semi-cylindrical recesses extending into the contact surfaces to collectively form a first cylindrical opening when the half segments are secured to each other, the first cylindrical openings of the aft end clamp and the discharge end clamp receiving the coating tube to apply a clamping force to secure the coating tube in position with respect to the coating lance.

15. The coating tube of claim 14, wherein the half segments for each of the aft end clamp and the discharge end clamp include a second pair of semi-cylindrical recesses extending into the contact surfaces to collectively form a second cylindrical opening when the half segments are secured to each other, the second cylindrical opening of the discharge end clamp aligned with a second opening in the insert head portion to provide a pathway through the insert head portion and the aft end clamp for discharge of the pressurized air adjacent to the nozzle end part, and wherein the second cylindrical opening of the aft end clamp provides access to the interior of the lance body adjacent the charging end of the clamp body for receipt of the pressurized air into the lance body interior.

16. A coating lance for applying a coating spray onto a surface, the coating lance comprising:

a tubular lance body defining an interior space and opposite charging and discharging ends, the lance body having first and second segments respectively defining the charging and discharging ends and interconnected to each other in an intermediate joint region, the first and second segments made from dissimilar materials;

a coating tube housed within the interior space of the lance body to extend between the charging and discharging ends to convey a coating material through the lance body; and a nozzle end part attached to a discharge end of the coating tube, the nozzle end part being tubular and having inner and outer dimensions substantially matching inner and outer dimensions of the coating tube, the nozzle end part attached to the coating tube by welding, wherein the material for the first body segment of the lance body is stainless steel and the material for the second body segment is carbon fiber.

17. The coating lance of claim 16, wherein the nozzle end part includes first, second and third bends to define first, second, third and fourth segments for the nozzle end part, and wherein the bends and segments are configured such that two of the segments are substantially parallel to each other and offset from one another.

18. A hybrid coating lance comprising:

an elongated tubular lance body defining an interior space and having first and second body segments interconnected with each other in a joint region, the first body segment made from a metal and the second body segment made from carbon fiber, the first metal segment including first, second and third portions, the first portion defining a charging end of the lance body and having a first outer body diameter, the second portion located forwardly of the first portion and having an outer diameter that transitions from the first outer body diameter to a second outer body diameter that is less than the first outer body diameter, the third portion located forwardly of the second portion and having an outer diameter that is substantially equal to the second outer body diameter, the second carbon fiber body segment defining a discharging end of the lance body and having an outer diameter that is substantially constant throughout a length of the body segment;

a coating tube housed within the interior space of the lance body to convey a coating material between the charging and discharging ends of the lance body; and a tubular nozzle end part attached to coating tube adjacent the discharging end of the lance body, the nozzle end part having inner and outer dimensions substantially matching inner and outer dimensions of the coating tube, the nozzle end part attached to the coating tube by welding.

19. The hybrid coating lance of claim 18, further comprising:

a discharge end insert received in the discharging end of the lance body;

a discharge end clamp secured to the discharge end insert; and a charge end clamp secured to the charging end of the lance body, the clamps receiving the coating tube and applying a clamping force to the coating tube to secure the coating tube in position with respect to the lance body.

* * * * *